(12) United States Patent
Walker et al.

(10) Patent No.: US 7,272,569 B1
(45) Date of Patent: Sep. 18, 2007

(54) METHOD AND APPARATUS FOR CONTROLLING THE PERFORMANCE OF A SUPPLEMENTARY PROCESS AT A POINT-OF-SALE TERMINAL

(75) Inventors: Jay S. Walker, Ridgefield, CT (US); Andrew S. Van Luchene, Norwalk, CT (US); Dean Alderucci, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/045,386

(22) Filed: Mar. 20, 1998

Related U.S. Application Data (63) Continuation-in-part of application No. 08/920,116, filed on Aug. 26, 1997, now Pat. No. 6,119,099, and a continuation-in-part of application No. 08/841,791, filed on May 5, 1997, now Pat. No. 5,926,796, which is a continuation-in-part of application No. 08/822,709, filed on Mar. 21, 1997, now Pat. No. 6,267,670.

(51) Int. Cl.
*G06Q 20/00* (2006.01)
(52) U.S. Cl. .............. 705/16; 705/26; 705/14
(58) Field of Classification Search ........... 705/16, 705/14, 26; 364/401, 551, 550; 340/825, 340/286
See application file for complete search history.

(56) References Cited

U.S. PATENT DOCUMENTS

| | | | |
|---|---|---|---|
| 3,573,747 A | 4/1971 | Adams et al. | |
| 4,108,361 A | 8/1978 | Krause | |
| 4,323,770 A | 4/1982 | Dielot et al. | |
| 4,494,197 A | 1/1985 | Troy et al. | |
| 4,500,880 A | 2/1985 | Gomersall et al. | |
| 4,669,730 A | 6/1987 | Small | |
| 4,677,553 A | 6/1987 | Roberts et al. | ............. 364/412 |
| 4,689,742 A | 8/1987 | Troy et al. | |
| 4,723,212 A | 2/1988 | Mindrum et al. | |

(Continued)

FOREIGN PATENT DOCUMENTS

EP  0 085 546 A2  8/1983

(Continued)

OTHER PUBLICATIONS

Advertising Age's Business Marketing; Chicago; Brian Reilly; "Upselling' strategies hit the Net," Dec. 1996, one page.*

(Continued)

*Primary Examiner*—Andrew Joseph Rudy (57) ABSTRACT

A POS terminal measures one or more criteria, such as the activity rate of the POS terminal. For example, the POS terminal may measure the number of completed transactions per time, the number of items purchased through the POS terminal per time, the number of upsells accepted by customers per time, the number of customers in a store or the number of customers in the vicinity of the POS terminal. The POS terminal in turn compares the measured criteria with a predetermined threshold. Based on the results of the comparison, the POS terminal determines whether to perform a supplementary process. For example, the POS terminal may perform the supplementary process only if the number of transactions per minute is less than a predetermined threshold.

10 Claims, 7 Drawing Sheets

U.S. PATENT DOCUMENTS

| | | | |
|---|---|---|---|
| 4,760,247 A | 7/1988 | Keane et al. | |
| 4,815,741 A | 3/1989 | Small | |
| 4,825,045 A | 4/1989 | Humble | |
| 4,839,507 A | 6/1989 | May | |
| 4,854,590 A | 8/1989 | Jolliff et al. | |
| 4,859,838 A | 8/1989 | Okiharu | |
| 4,882,473 A | 11/1989 | Bergeron et al. | |
| 4,908,761 A | 3/1990 | Tai | |
| 4,910,672 A | 3/1990 | Off et al. | |
| 4,922,522 A | 5/1990 | Scanlon | |
| 4,937,853 A | 6/1990 | Brule et al. | |
| 4,973,952 A | 11/1990 | Malec et al. | |
| 4,982,337 A | 1/1991 | Burr et al. | |
| 4,993,714 A | 2/1991 | Golightly | |
| 5,056,019 A | 10/1991 | Schultz et al. | |
| 5,119,295 A | 6/1992 | Kapur | |
| 5,128,862 A | 7/1992 | Mueller | |
| 5,132,914 A | 7/1992 | Cahlander et al. | |
| 5,172,328 A | 12/1992 | Cahlander et al. | |
| 5,173,851 A * | 12/1992 | Off et al. | |
| 5,177,342 A | 1/1993 | Adams | |
| 5,192,854 A | 3/1993 | Counts | |
| 5,201,010 A | 4/1993 | Deaton et al. | |
| 5,216,595 A | 6/1993 | Protheroe | |
| 5,223,698 A | 6/1993 | Kapur | |
| 5,231,569 A | 7/1993 | Myatt et al. | |
| 5,239,165 A | 8/1993 | Novak | |
| 5,243,515 A | 9/1993 | Lee | |
| 5,245,533 A | 9/1993 | Marshall | |
| 5,256,863 A | 10/1993 | Ferguson et al. | |
| 5,260,553 A * | 11/1993 | Rockstein et al. | 235/462 |
| 5,262,941 A | 11/1993 | Saladin et al. | |
| 5,274,547 A | 12/1993 | Zoffel et al. | |
| 5,283,731 A | 2/1994 | Lalonde et al. | |
| 5,287,268 A | 2/1994 | McCarthy | |
| 5,297,031 A | 3/1994 | Gutterman et al. | |
| 5,302,811 A | 4/1994 | Fukatsu | |
| 5,309,355 A | 5/1994 | Lockwood | |
| 5,353,218 A | 10/1994 | De Lapa et al. | |
| 5,353,219 A | 10/1994 | Mueller et al. | |
| 5,355,327 A * | 10/1994 | Stent et al. | 364/551 |
| 5,380,991 A | 1/1995 | Valencia et al. | |
| RE34,915 E | 4/1995 | Nichtberger et al. | |
| 5,408,210 A * | 4/1995 | Oka | 340/286 |
| 5,420,606 A | 5/1995 | Begum et al. | |
| 5,428,606 A | 6/1995 | Moskowitz | |
| 5,459,306 A | 10/1995 | Stein et al. | |
| 5,465,085 A * | 11/1995 | Caldwell et al. | 340/825 |
| 5,481,094 A | 1/1996 | Suda | |
| 5,504,475 A | 4/1996 | Houdou et al. | |
| 5,510,979 A | 4/1996 | Moderi et al. | |
| 5,521,364 A | 5/1996 | Kimura et al. | |
| 5,528,490 A | 6/1996 | Hill | |
| 5,537,314 A * | 7/1996 | Kanter | 705/14 |
| 5,544,040 A | 8/1996 | Gerbaulet | |
| 5,557,513 A * | 9/1996 | Frey et al. | |
| 5,572,653 A | 11/1996 | DeTemple et al. | |
| 5,581,064 A | 12/1996 | Riley et al. | |
| 5,592,375 A | 1/1997 | Salmon et al. | |
| 5,592,376 A | 1/1997 | Hodroff | |
| 5,602,377 A | 2/1997 | Beller et al. | |
| 5,611,052 A | 3/1997 | Dykstra et al. | |
| 5,612,868 A | 3/1997 | Off et al. | |
| 5,615,269 A | 3/1997 | Micali | |
| 5,620,079 A | 4/1997 | Molbak | |
| 5,621,201 A | 4/1997 | Langhans et al. | |
| 5,621,640 A * | 4/1997 | Burke | 705/14 |
| 5,621,812 A * | 4/1997 | Deaton et al. | 382/100 |
| 5,630,103 A | 5/1997 | Smith et al. | |
| 5,632,010 A | 5/1997 | Briechle et al. | |
| 5,664,115 A | 9/1997 | Fraser | |
| 5,665,953 A | 9/1997 | Mazzamuto et al. | |
| 5,694,546 A | 12/1997 | Reisman | |
| 5,724,886 A | 3/1998 | Ewald et al. | |
| 5,759,101 A | 6/1998 | Von Kohorn | |
| 5,794,210 A | 8/1998 | Goldhaber et al. | |
| 5,845,276 A * | 12/1998 | Emerson et al. | 707/2 |
| 5,890,718 A | 4/1999 | Byon | |
| 5,924,077 A * | 7/1999 | Beach et al. | 705/10 |
| 5,926,796 A | 7/1999 | Walker et al. | |
| 6,014,641 A | 1/2000 | Loeb et al. | |
| 6,021,390 A | 2/2000 | Satoh et al. | |
| 6,055,513 A * | 4/2000 | Katz et al. | 705/26 |
| 6,229,879 B1 | 5/2001 | Walker et al. | |

FOREIGN PATENT DOCUMENTS

| | | |
|---|---|---|
| EP | 0 109 189 A1 | 5/1984 |
| EP | 512413 | 11/1992 |
| FR | 2 757 656 A1 | 6/1998 |
| JP | 5242363 | 9/1993 |
| JP | 07-231309 | 8/1995 |
| WO | WO96/36926 | 11/1996 |
| WO | WO97/28510 | 8/1997 |
| WO | WO9735441 | 9/1997 |
| WO | WO97/46961 | 12/1997 |
| WO | WO97/50064 | 12/1997 |

OTHER PUBLICATIONS

Computer Reseller News; Manhasset; Preston P. Forman; "Vendors practice what they preach," Mar. 2, 1998, three pages.*

Louis Cook, "Consumer Watch: Clip, Snip, Save", The Associated Press, Mar. 12, 1984, Monday PM Cycle.

"Coupons Get Serious; Supermarkets Use Barcodes to Prevent Misredemptions", Chain Store Age Executive with Shopping Center Age, Oct. 1992, vol. 68; No. 10; at p. 68; ISSN: 0193-1199.

Joseph Bonnici, David P. Campbell, William B. Fredenberger, Kathryn H. Hunnicutt; "Consumer Issues in Coupon Usage; An Exploratory Analysis", Journal of Applied Business Research, Winter 1996/1997, vol. 13, No. 1 at p. 31-40; ISSN: 0892-7626.

Jim Kirk, "Digital Promotions Make Quick Point—McDonald's Testing New Technology on its Menus", Chicago Tribune, Dec. 26, 1997 at p. 1-2.

"Progressive Introduces Kitchen Display System (KDS) for Restaurants", PR Newswire, Jan. 23, 1998, Financial News Section.

Adam Blair, "JICC Coupon Guide Recommends Upgrades at Front End", Supermarket News, Feb. 9, 1998, at p. 23; ISSN: 0039-5803.

"From Our Family To Yours . . . 5 Weeks of Coupon Values for a Variable Customer", Wakefern Food Corporation, Feb. 1998.

"U.P.C. Coupon Code Guidelines Manual—Section . . . ", Uniform Code Council, Inc., (http://www.uc-council.org/d31-3.htm), download date: Mar. 12, 1998.

"Advanced Mechanics Internet Specials", Advanced Mechanics, (http://www.metroplexweb.com/advcpn2.htm), download date: Mar. 12, 1998.

Mark Hamstra, "Made-for -you' maneuvers signal competitive shift in QSR category", Nations Restaurant News, Apr. 13, 1998, 3 pgs.

"New Wave Marketing", Promotion Times an SCA Quarterly Newsletter, Apr. 1998.

Universal Holding Cabinet Rollout Program Brochure, H&K Dallas Inc., Winter 1998.

NCR 7453 PC-Based Point-of-Sale Solution Brochure, NCR, Winter 1998.

"POSitive Input; The McDonald's POS-3 System Newsletter from Olivetti Solutions", McDonald's Spring /Summer Edition 1998, 8 pgs.

"It's In The Bag. Introducing the Universal Holding Cabinet From Welbilt", Frymaster, 1998 brochure.

Myhre, James W., "Examiner's Affidavit", dated Feb., 22, 2001.

"Magazine Subscription Sales Center—Where buying subscriptions is easy!", Customer Service Information, Interactive Magazine Sales, Inc, Email: aim@panix com.

Brochure, "Reaching Out In New Directions", First Data Corp. Merchant Services, undated.

Howland, Jennifer, "National distribution: scanning the future.", Folio: The Magazine for Magazine Management, Feb. 1985, Section: vol. 14, p. 69, ISSN: 0046-4333.

Wood, Wally, "Circulation marketing: let your magazine do the selling.", Folio: The Magazine for Magazine Management, Jun. 1985, vol. 14, p. 78, ISSN: 0046-4333.

Reese, Diane, "Revitalizing single-copy sales.", Folio: The Magazine for Magazine Management, Feb. 1986, vol. 15, p. 84, ISSN: 0046-4333.

Joyce, Walter, "Muscular merchandising; column", Folio: The Magazine for Magazine Management, Jun. 1986, vol. 15, p. 124, ISSN: 0046-4333.

"Phoenix Papers to Sell Merchandise to Build Awareness", Editor & Publisher, Sep. 17, 1988, vol. 121, Issue 38, p. 23, ISSN: 0013-094X.

Donaton, Scott, "Gift subscriptions find retail niche", Advertising Age, Jul. 16, 1990, Section: News at p. 37.

Guy, Pat, "A gift off the rack: Mag subscription", USA Today, Dec. 19, 1990, Section: Money at p. 2B.

Jaben, Jan, "Magazine gift-giving made simple at retail outlets; Time Inc., Hearst, Meredith test Subscriber Systems' method of selling gift subscriptions; News", Folio's Publishing News, Feb. 15, 1991, vol. 3, No. 2, p. 15, ISSN: 1043-8688.

Horton, Liz, "Holiday gift subs up, some due to novel promotions.", Folio: The Magazine for Magazine Management, Feb. 1, 1992, Section: vol. 21, No. 2, p. 39, ISSN: 0046-4333.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333.

Manly, Lorne, "A newsstand for the electronic age", Folio: The Magazine for Magazine Management, Sep. 15, 1993, vol. 22, No. 16, p. 17, ISSN: 0046-4333.

Hochwald, Lambeth, "Sub sources that break with tradition", Folio: The Magazine for Magazine Management, May 1, 1994, vol. 23, Issue 8, pp. 46-48, ISSN: 0046-4333.

Love, Barbara, "Selling Subscriptions at newsstands", Folio: The Magazine for Magazine Management, Jun. 1, 1994, vol. 23, Issue 10, p. 10, ISSN: 0046-4333.

"The super subs", Precision Marketing, Oct. 24, 1994, No. 0, vol. 0, p. 23, ISSN: 0957-4913.

Cyr, Diane, "Distribution woes; declining newsstand circulation; includes related article on preventing newsstand fraud", Folio: The Magazine for Magazine Management, Jan. 1995, vol. 23, No. 19, p. 170, ISSN: 0046-4333.

Love, Barbara, "Folio: plus circulation; techniques for managing magazine circulation", Folio: The Magazine for Magazine Management, Jan. 1995, vol. 23, No. 19, p. 159, ISSN: 0046-4333.

Kelly, Keith J., "Hearst opens a cyberspace newsstand", Advertising Age, Jan. 30, 1995, vol. 66, Issue 5, p. 14. ISSN: 0001-8899.

Schnuer, Jenna, "Overnight options add to distribution mix; distribution of Inside Sports' magazine", Folio: The Magazine for Magazine Management, Mar. 1, 1995, vol. 24, No. 4, p. 19, ISSN: 0046-4333.

Kelly, Keith J., "Publishers pine for cyber-profits", Time Inc., Mar. 13, 1995, vol. 66, Issue 11, pp. S-22, ISSN: 0001-8899.

"Hearst Corporation launches 'The Multimedia Newsstand'", Link-Up, Mar./Apr. 1995, vol. 12, Issue 2, pp. 1, 36, ISSN: 0739-988X.

Wilson, Steve, "Out of print—but not business; magazines move away from print in favor of electronic publishing", Folio: The Magazine for Magazine Management, May 1, 1995, vol. 24, No. 8, p. 22, ISSN: 0046-4333.

Hochwald, Lambeth, "Postal blues: circulators cope with the rate crunch.", Folio: The Magazine for Magazine Management, May 1, 1995, vol. 24, No. 8, p. 54, ISSN: 0046-4333.

"Tretorn Offers Magazine Promo", Adweek, May 1, 1995, Section: Newswire.

"Lotto World", MediaWeek, May 8, 1995, vol. 5, No.19, at p. 16(1).

Graham, Anne, "Nonmember subs—or not? Nonmember subscriptions to association magazines; includes tips from publishers", Folio: The Magazine for Magazine Management, Jun. 1, 1995, vol. 24, No. 10, p. 47, ISSN: 0046-4333.

Miller, Paul, "Magazine deal lacks catalog appeal; Brief Article", Folio: The Magazine for Magazine Management, Jun. 15, 1995, vol. 24, No. 11, p. 30, ISSN: 0046-4333.

Wilson, Steve, "Directory assistance: a buyer's guide can give you a big boost in revenue and attract new advertisers and subscribers.", Folio: The Magazine for Magazine Management, Oct. 1, 1995, vol. 24, No. 16, p. 40, ISSN: 0046-4333.

Garratt, David, "What premium on on-cover premiums?", Folio: The Magazine for Magazine Management, Oct. 1, 1995, vol. 24, No. 16, p. 53, ISSN: 046-4333.

"HFS Incorporates and Hachette Filipacchi Magazines; announce launch of Century 21 House & Home Magazine . . . ", Business Wire, Nov. 20, 1995.

Hochwald, Lambeth, "Circulation secrets: nine steps to a successful circulation launch strategy includes list of resources", Folio: The Magazine for Magazine Management, Feb. 1, 1996, vol. 25, No. 2, p. 53, ISSN: 0046-4333.

Kerwin, Anne Marie, "Notably at the newsstand: InStyle, Financial World push for greater single-copy sales.", Inside Media, Feb. 7, 1996, vol. 8, No. 3, p. 26, ISSN: 1046-5316.

Adams, Mark, "Capell reports sales drop at newsstands", Mediaweek, Mar. 11, 1996, vol. 6, No. 11, p. 27, ISSN: 1055-176X, CODEN: MADEAP.

McKinney, Jeff, "Merchant program could pay off for Provident", The Cincinnati Enquirer, Mar. 24, 1996, Section: Financial, p. E02.

Raab, David M., "Package Aids Catalog Management", DM News, Apr. 22, 1996, Section: Software Review, p. 14.

Hodges, Jane, "'WSJ' puts squeeze on Web subscriptions", Advertising Age, Apr. 29 1996, vol. 67, Issue 18, p. 34, ISSN: 0001-8899.

Schnuer, Jenna, "A world without magazines? Consumers weigh in survey of consumers indicates that . . . ", Folio: The Magazine for Magazine Management, Jun. 1, 1996, vol. 25, No. 9, p. 16, ISSN: 0046-4333.

"Bigger Plans (Provident Bank, issuer of MeritValue customer loyalty card, plans to offer program in 25 cities in six months)", Cardfax, Oct. 7, 1996, vol. 96, No. 178, p. 2.

Fickenscher, Lisa, "Amex to Start Free Rewards Program with Discounts on Merchandise", The American Banker, Oct. 18, 1996, Section: Credit/Debit/ATMs, p. 10.

Fitzgerald, Kate, "Amex Program Moves Loyalty to Next Level: Custom Extras Finds a Medium Customers Can't Ignore: Billing Statements", Advertising Age, Nov. 4, 1996, Section: News, p. 2.

Tedesco, Richard, "Time launches 'Net subscription service", Broadcasting & Cable, Nov. 11, 1996, vol. 126, Issue 47, p. 65, ISSN: 1068-6827.

Quittner, Jeremy, "Ohio's Provident brings its discount card to Fla.", American Banker, Feb. 11, 1997, vol. 162, Issue 28, p. 11, ⅓ p, ISSN: 0002-7561.

Symons, Allene, "Lucky, Sav-on debut Rewards Card.", Drug Store News, Feb. 17, 1997, vol. 19, Issue 4, p. 3, IC, ISSN: 0191-7587.

Mckeveny, Alexander, "Giving Them a Good Reason", Bank Marketing, Mar. 1997, Vo. 29, Issue 3, p. 37, 4P, 4C, ISSN: 0888-3148.

Fickenscher, Lisa, "Merchant: American Express Seeks to Mine Its Data on Cardholder Spending Patterns", The American Banker, Mar. 24, 1997, Section: Credit/Debit/ATMs, p. 20.

Case, Tony, "The electronic newsstand branches out", Folio: The Magazine for Magazine Management, Apr. 1, 1997, vol. 26, Issue 5, p. 13, ISSN: 0046-4333.

"Dispensing the future", Electronic Payments International, May 1997, Section: Feature, p. 12.

"Industry Briefs", Card News, Jun. 9, 1997, Section: vol. 12, No. 11.

Krol, Carol, "Magazine site to focus on commerce", Advertising Age, Aug. 18, 1997, vol. 68, Issue 33, p. 18, ISSN: 0001-8899.

Hoeschen, Brad, "Brookfield Square hopes mall card strikes a chord", Business Journal-Milwaukee, Sep. 12, 1997, Section: vol. 14, No. 50, p. 19.

Website: "NCR 7452 Workstation—Beyond Traditional POS", (http//www ncr com/product/retail/products/catalog/7452 shtm), downloaded date: Sep. 23, 1997.

"NCR 7453 PC-Based Point-of-Sale Solution", NCR Corporation, Copyright 1998.

"Cape Town," Reuters, Nov. 8, 1979, Thursday PM Cycle.

"Save The Mark," Financial Times (London), Feb. 1, 1983, Section 1: Men & Matters at p. 12.

"Let's Play the Cash Register Receipts Lottery," The New York Times, Dec. 25, 1990, Section 1, p. 30, col. 4, Editorial Desk.

"Phillips Offers Customers Financing Through Citicorp; Philips Medial Systems North America, Citicorp North America Inc.," Health Industry Today, Jun. 1991, vol. 54, No. 6, p. 4.

Del Rosso, Laura, "Marketel Says It Plans To Launch Air Fare 'Auction' In Jun," Travel Weekly, Apr. 29, 1991, vol. 50, No. 34, p. 1.

Pelline, Jeff, "Travelers Bid on Airline Tickets SF Firm Offers Chance For Cut-Rate Fares," The San Francisco Chronicle, Aug. 19, 1991, p. A4.

Del Rosso, Laura, "Ticket-bidding Firm Closes Its Doors; Marketed International Brief Article," Travel Weekly, Mar. 12, 1992, vol. 51, No. 21, p. 1.

"Winn-Dixie/The Salvation Army Report Contribution For War Against Hunger," PR Newswire, Jun. 10, 1993, Financial News Section.

Jones, Jeanne, "Data Readers Streamline Management; Scanner Technology Aids Retailers As Well As Plants, Wholesalers," The Houston Post, Jun. 26, 1994, Business Section, p. D1.

Fiorini, Phillip, "'No Place for Penny?' Smallest Coin Doesn't Make Cents to Some," USA Today, Jul. 29, 1994, p. 1A.

Smith, Alison, "Survey of UK Consumer Credit and Asset Finance," Financial Times, Nov. 3, 1994, p. VI.

Andreoli et al., "Cash Machines Offer A Whole Lotto Money For Withdrawal . . . ," Crain's Chicago Business, Jun. 19, 1995, News Section, p. 8.

"Spain: BBV Launches New Card," Cards International, Jun. 22, 1995, p. 5.

Knippenberg, Jim, "Psst! Will Local Radio Empires Strike Back?" The Cincinatti Enquirer, Jul. 23, 1994, p. F01.

"Cyber Bid," Net Fund Ltd., Copyright 1996, Brochure.

Hadley, Kimberly, "Pastors Praying Anti-arson Effort Will Burn Bias," The Nashville Banner, Jul. 26, 1996, p. A13.

Gapper, John, "NatWest Reports Rise in Bad Debt," Financial Times, Jul. 31, 1996, London Edition 3, News: UK Section p. 09.

"Lynx Technology: Lynx To Provide Business Leasing Programme Through Schroder Leasing," M2 Presswire, Aug. 9, 1996.

Taylor, Paul, "Towards A Dream Market," Financial Times, (London), Sep. 4, 1996, p. 03.

Rehayem, Gilbert, "Opinion: X-Press Betting," LaFleur's Lottery World, Feb. 7, 1997, p. 4.

Singletary, Michelle, "Electronic World, Unchecked Problem? U.S. Move to Paperless Payments Raises Worries About Those Who Don't Use Banks," The Washington Post, Mar. 4, 1997, Final Edition, Financial Section, p. C01.

"AVCO Financial Services," National Home Furnishing Association, (http://www.homefurnish.com/NHFA/avco.htm), download date: May 23, 1997.

"Products and Services: Checkout Direct," Catalina Marketing Corporation, (http://catalinamktg.com/prodcdir.htm), download date: May 29, 1997.

Burke, Bertram V., "Funneling Change to Useful Pursuits," The New York Times, Jun. 9, 1997, Section D, p. 2, (Note: article is located on 2nd page of attached copy).

"The Key To Your Identity: Falling Costs Will Allow Fingerprint Verification to be Widely Used, Reports Geoff Nairn," Financial Times (London), Jul. 15, 1997, Technology Section. p. 12.

"The United Computer Exchange, How It All Works," The United Computer Exchange Corporation, (http://www.uce.com/hotitworks.htm), download date: Jul. 23, 1997.

"Classifieds2000: The Internet Classifieds," Classifieds2000, Inc., (http://www.classifieds2000.com/cgi-cls/Display.exe?C2K+aboutus), download date: Aug. 6, 1997.

"General Trading Floor Information and Terms Provided by tradingfloor.com," (http://www.tradingfloor.com/info.htm), download date: Aug. 14, 1997.

"NASDAQ—Information Sheet," (http://home.axford.com/corfin/corf11.htm, download date: Aug. 15, 1997.

Prochaska-Cue, Kathy, "Acquiring Credit," (http://lanrwww.unl.edu/IAN/PUBS/NEBFACTS/NF91-2HTM), download date: Sep. 3, 1997.

Welcome to ONSALE: Auction Supersite,: ONSALE, (http://www.onsale.com/category/inv/00124972.htm), download date: Sep. 8, 1997.

"About IAO," Interactive Auction Online, (http://www/iaoauction.com/about.htm), download date: Sep. 8, 1997.

Kelsey, John; Schneier, Bruce, "Conditional Purchase Orders," Fourth ACM Conference on Computer Communication Security, Apr. 1997, ACM Press, pp. 117-124.

Kirk, Jim, "Digital Promotions Make Quick Point—McDonald's Testing New Technology on its Menus," Chicago Tribune, Dec. 26, 1997, pp. 1-2.

Livingston, Kimball, "In-Store Systems—VideOcart Redux," RT Magazine, Mar. 1998, pp. 29-30.

* cited by examiner

| ACTIVITY RATE IDENTIFIER 62 | ACTIVITY RATE (TRANSACTIONS PER 15 MINUTE PERIOD) 64 | UPSELL TO OFFER 66 |
|---|---|---|
| A | LESS THAN 8 | AN ADDITIONAL PRODUCT |
| B | BETWEEN 8 AND 15 | "TRIPLE-YOUR-CHANGE" COUPON |
| C | MORE THAN 15 | NONE |

| ACTIVITY RATE IDENTIFIER 122 | ACTIVITY RATE (% ALL POS TERMINALS IN USE) 124 | UPSELL TO OFFER 126 |
|---|---|---|
| A | LESS THAN 50% | ONE FROM A GROUP OF THREE ADDITIONAL PRODUCTS |
| B | BETWEEN 50% AND 80% | AN ADDITIONAL PRODUCT |
| C | BETWEEN 81% AND 90% | "TRIPLE-YOUR-CHANGE" COUPON |
| D | MORE THAN 90% | NONE |

Rows indicated by arrows: 128, 130, 132, 134

Table 120

FIG. 7

METHOD AND APPARATUS FOR CONTROLLING THE PERFORMANCE OF A SUPPLEMENTARY PROCESS AT A POINT-OF-SALE TERMINAL

The present application is a continuation-in-part application of (i) patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, issued on Sep. 12, 2000 as U.S. Pat. No. 6,119,099, which is a continuation-in-part of patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, issued on Jul. 31, 2001 as U.S. Pat. No. 6,267,670; and (ii) patent application Ser. No. 08/841,791, entitled METHOD AND APPARATUS FOR SELLING SUBSCRIPTIONS TO PERIODICALS IN A RETAIL ENVIRONMENT, filed on May 5, 1997, issued on Jul. 20, 1999 as U.S. Pat. No. 5,926,796, each of which are incorporated herein by reference.

CROSS REFERENCE TO CO-PENDING APPLICATIONS

The present invention is related to the following United States patent applications filed contemporaneously herewith:

U.S. patent application Ser. No. 09/045,036, entitled METHOD AND APPARATUS FOR FACILITATING THE PLAY OF FRACTIONAL LOTTERY TICKETS UTILIZING POINT-OF-SALE TERMINALS, U.S. patent application Ser. No. 09/045,518, entitled METHOD AND APPARATUS FOR PROCESSING A SUPPLEMENTARY PRODUCT AT A POINT-OF-SALE TERMINAL, U.S. patent application Ser. No. 09/045,084 entitled METHOD AND APPARATUS FOR CONTROLLING OFFERS THAT ARE PROVIDED AT A POINT-OF-SALE TERMINAL, issued on Apr. 24, 2001 as U.S. Pat. No. 6,223,163, and U.S. patent application Ser. No. 09/045,347, entitled METHOD AND APPARATUS FOR PROCESSING A SUPPLEMENTARY PRODUCT SALE AT A POINT-OF-SALE TERMINAL, now abandoned, each assigned to the assignee of the present invention and incorporated by reference herein.

FIELD OF THE INVENTION

The present invention relates to point-of-sale terminals, and, more specifically, to methods and apparatus for controlling the performance of supplementary processes at point-of-sale terminals.

BACKGROUND OF THE INVENTION

Point-of-sale ("POS") terminals, such as cash registers, are used in a wide variety of businesses for performing such processes as calculating the total price of a purchase (goods or services) and calculating the amount of change due to a customer. Some POS terminals furthermore track items sold and adjust a database of store inventory accordingly.

A POS terminal may perform a supplementary process in addition to performing the processes listed above. A supplementary process can increase sales, and thereby increase the average profit gained per transaction. One such supplementary process is described in a parent application of the present application, patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, issued on Sep. 12, 2000 as U.S. Pat. No. 6,119,099. Described therein is a supplementary process in which a customer at a POS terminal is offered an "upsell" in exchange for an amount of change due. The POS terminal determines an upsell in dependence on a purchase of the customer, and also determines an upsell price (the amount of change due) based on the purchase. For example, a customer purchasing a first product for $1.74 and tendering $2.00 may be offered a second product in lieu of the $0.26 change due. The upsell price, $0.26, thus depends on the purchase price $1.74.

Another supplementary process is a computer-determined "suggestive sell". U.S. Pat. No. 5,353,219 describes a system for suggesting items for a customer to purchase from a primary category at conventional item prices. Still another supplementary process is described in a parent application of the present application, patent application Ser. No. 08/841,791, entitled METHOD AND APPARATUS FOR SELLING SUBSCRIPTIONS TO PERIODICALS IN A RETAIL ENVIRONMENT, filed on May 5, 1997, issued on Jul. 20, 1999 as U.S. Pat. No. 5,926,796. Described therein is a supplementary process Such supplementary processes may be performed solely within the POS terminal itself. For example, a cash register may be programmed to calculate an amount of change due, and determine an upsell to offer in exchange for the change due. Alternatively, the supplementary process may be performed with the assistance of a device in communication with the cash register. For example, a remote server computer connected to the cash register via a communications network may determine an upsell to offer in exchange for the change due.

A supplementary process performed at a POS terminal may undesirably slow the rate at which customer transactions are completed. For example, it may take several seconds for a cashier operating a POS terminal to offer a customer an upsell in exchange for an amount of change due, and for the customer to decide whether to accept such an offer. Offering a customer a choice of several upsells in exchange for an amount of change due could impose yet further delays on completing customer transactions.

Such delays may be acceptable under some conditions, yet unduly burdensome under other conditions. For example, during lunch or other times of day, there may be a long line at a POS terminal. It would be inadvisable to add to the wait of each customer in line by performing a supplementary process as well. However, eliminating the supplementary processes may speed the completion of customer transactions, but at the cost of the extra profit derived from such supplementary processes. Accordingly, a need exists for controlling the performance of supplementary processes at POS terminals.

SUMMARY OF THE INVENTION

It is an object of the present invention to provide a method and apparatus for controlling the performance of a supplementary process at a point-of-sale terminal.

In accordance with the present invention, one or more POS terminals measure one or more criteria, such as the activity rate of the POS terminal. For example, the POS terminal may measure the number of completed transactions per period of time, the number of items purchased through the POS terminal per period of time, the number of upsells accepted by customers per period of time, the number of customers in a store or the number of customers in the vicinity of the POS terminal. The POS terminal in turn compares the measured criteria with a predetermined threshold. Based on the results of the comparison, the POS terminal determines whether to perform a supplementary process. For example, the POS terminal may perform the supplementary process only if the number of transactions per minute is less than a predetermined threshold.

DETAILED DESCRIPTION OF THE PREFERRED EMBODIMENTS

Applicants have recognized that supplementary processes performed by POS terminals may introduce delays in the completion of customer transactions, and that these delays may be acceptable under certain circumstances. For example, when there are few pending customer transactions, such delays do not significantly affect relevant measures of performance such as sales per hour or profit per hour.

Accordingly, performing supplementary processes during periods of low activity, yet reducing or refraining from supplementary processes during periods of high activity, can result in increased profit. Such increased profit can exceed the profit of POS terminals that either always perform the supplemental process or never perform the supplemental process.

In one embodiment of the present invention, a POS terminal measures one or more criteria, such as an activity rate of a terminal, and performs a supplementary process if the criteria are less than predetermined thresholds. In another embodiment, a POS terminal measures an activity rate of a terminal, determines an offer schedule in accordance with the activity rate, and in turn provides a supplementary product offer in accordance with the offer schedule. The offer schedule may specify that time-consuming offers (offers with a low "offer speed") are made during periods of low terminal activity, while quicker offers (offers with a high "offer speed") are made during periods of higher terminal activity.

It is particularly desirable to provide an offer to exchange spare change due for an upsell, as described in the aforementioned parent application, application Ser. No. 08/920, 116, issued on Sep. 12, 2000 as U.S. Pat. No. 6,119,099. Accordingly, the present invention contemplates providing offers for upsells having high performance rates. In addition, the present invention contemplates providing offers for different upsells in accordance with an offer schedule.

Figure 1:
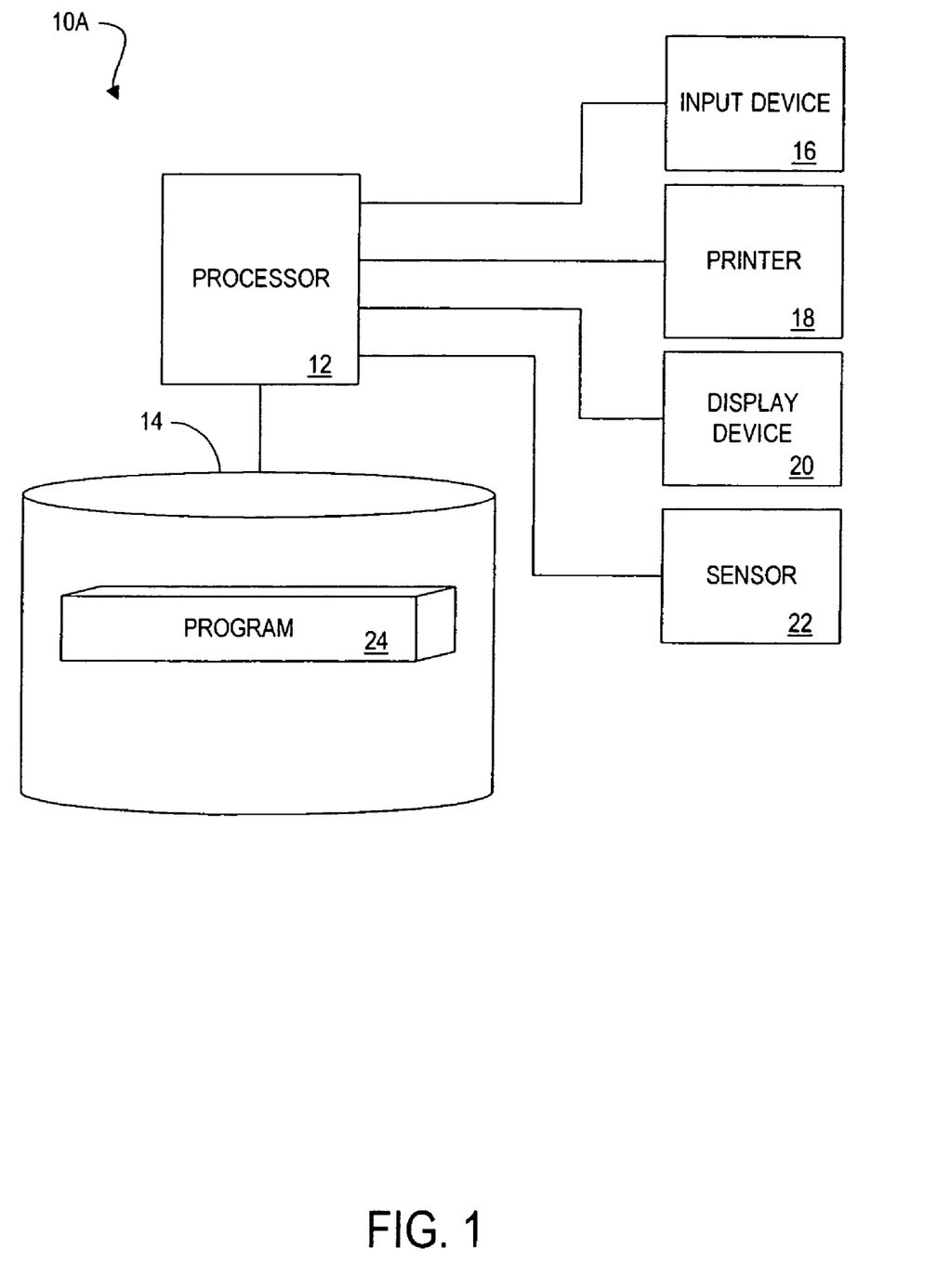
FIG. 1 is a schematic illustration of a POS terminal provided in accordance with the present invention.

Referring to FIG. 1, a POS terminal 10, which may be the IBM 4683 or IBM 4693 manufactured by International Business Machines, comprises a processor 12, such as one or more conventional microprocessors. The processor 12 is in communication with a data storage device 14, such as an appropriate combination of magnetic, optical and/or semiconductor memory. The processor 12 and the storage device 14 may each be (i) located entirely within a single computer or other computing device; (ii) connected to each other by a remote communication medium, such as a serial port cable, telephone line or radio frequency transceiver; or (iii) a combination thereof. For example, the POS terminal 10 may comprise one or more computers which are connected to a remote server computer for maintaining databases.

An input device 16 preferably comprises a keypad for transmitting input signals, such as signals indicative of a purchase, to the processor 12. A printer 18 is for registering indicia on paper or other material, thereby printing receipts, coupons and vouchers as commanded by the processor 12. A display device 20 is preferably a video monitor for displaying at least alphanumeric characters to the customer and/or cashier. Many types of input devices, printers and display devices are known to those skilled in the art, and need not be described in detail herein. The input device 16, printer 18 and display device 20 are each in communication with the processor 12.

A sensor 22 is also in communication with the processor 12. The sensor 22 and processor 12 may be used to measure, for example, the number of customers entering a store or the number of customers in the vicinity of the POS terminal 10. Many other types of sensors are known and need not be described in detail herein.

The storage device 14 stores a program 24 for controlling the processor 12. The processor 12 performs instructions of the program 24, and thereby operates in accordance with the present invention, and particularly in accordance with the methods described in detail herein. The program 24 furthermore includes program elements that may be necessary, such as an operating system and "device drivers" for allowing the processor to interface with computer peripheral devices, such as the input device 16, the printer 18, the display device 20 and the sensor 22. Appropriate device drivers and other necessary program elements are known to those skilled in the art, and need not be described in detail herein.

Figure 2:
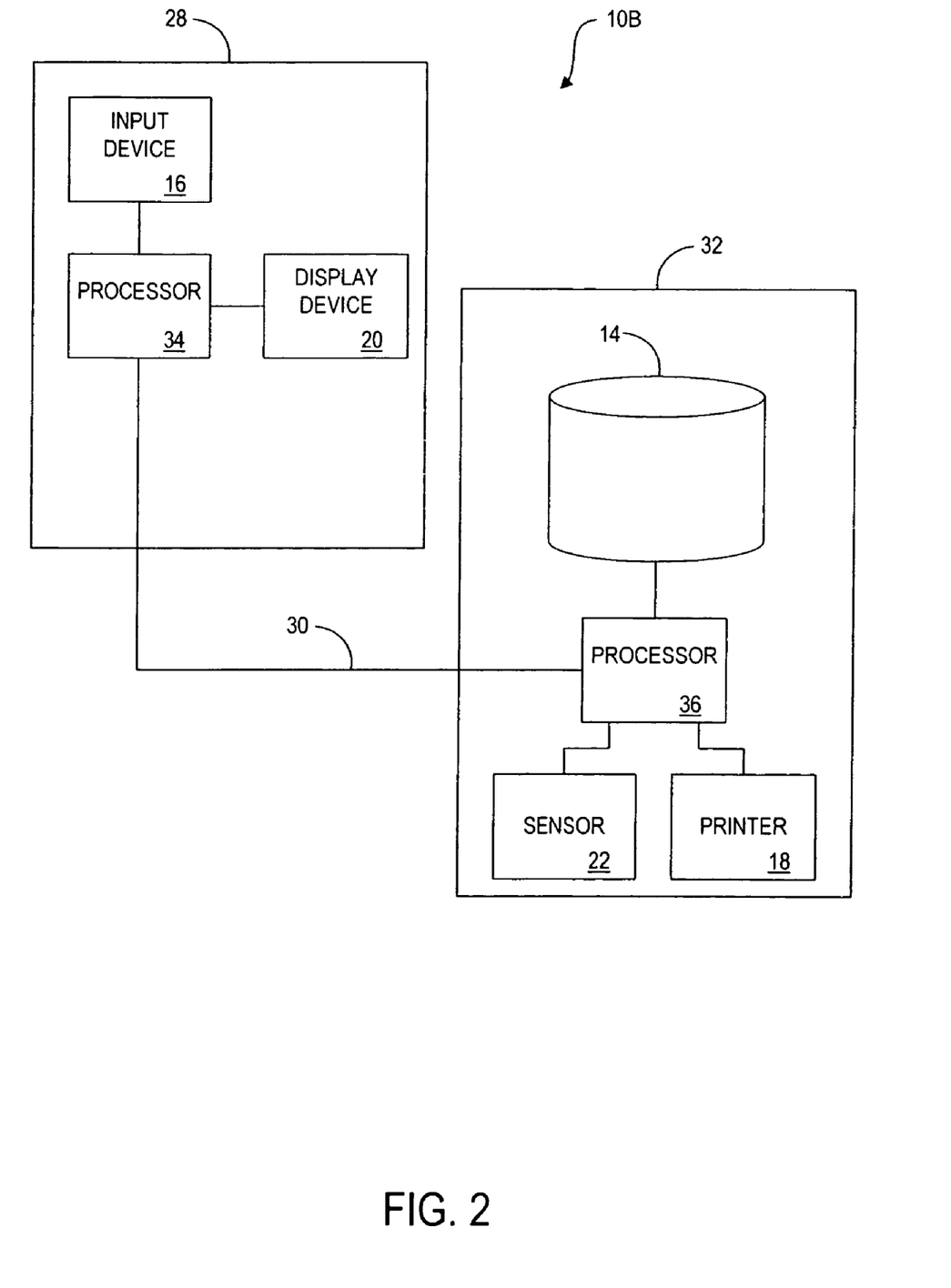
FIG. 2 is a schematic illustration of another embodiment of the POS terminal of FIG. 1.

FIG. 2 illustrates another embodiment of the POS terminal 10 of FIG. 1, in which a control device 28 is in communication via a communication medium 30 with a system 32 for providing a supplementary process. The control device 28 comprises a processor 34 in communication with the input device 16 and the display device 20. The system 32 for providing a supplementary process comprises a processor 36 in communication with the storage device 14, the printer 18 and the sensor 22. In this embodiment, the control device 28 may be a cash register, and the system 32 may be an electronic device connected thereto for printing coupons in accordance with data received from the cash register. Other configurations of the POS terminal 10 will be understood by those skilled in the art.

Figure 3:
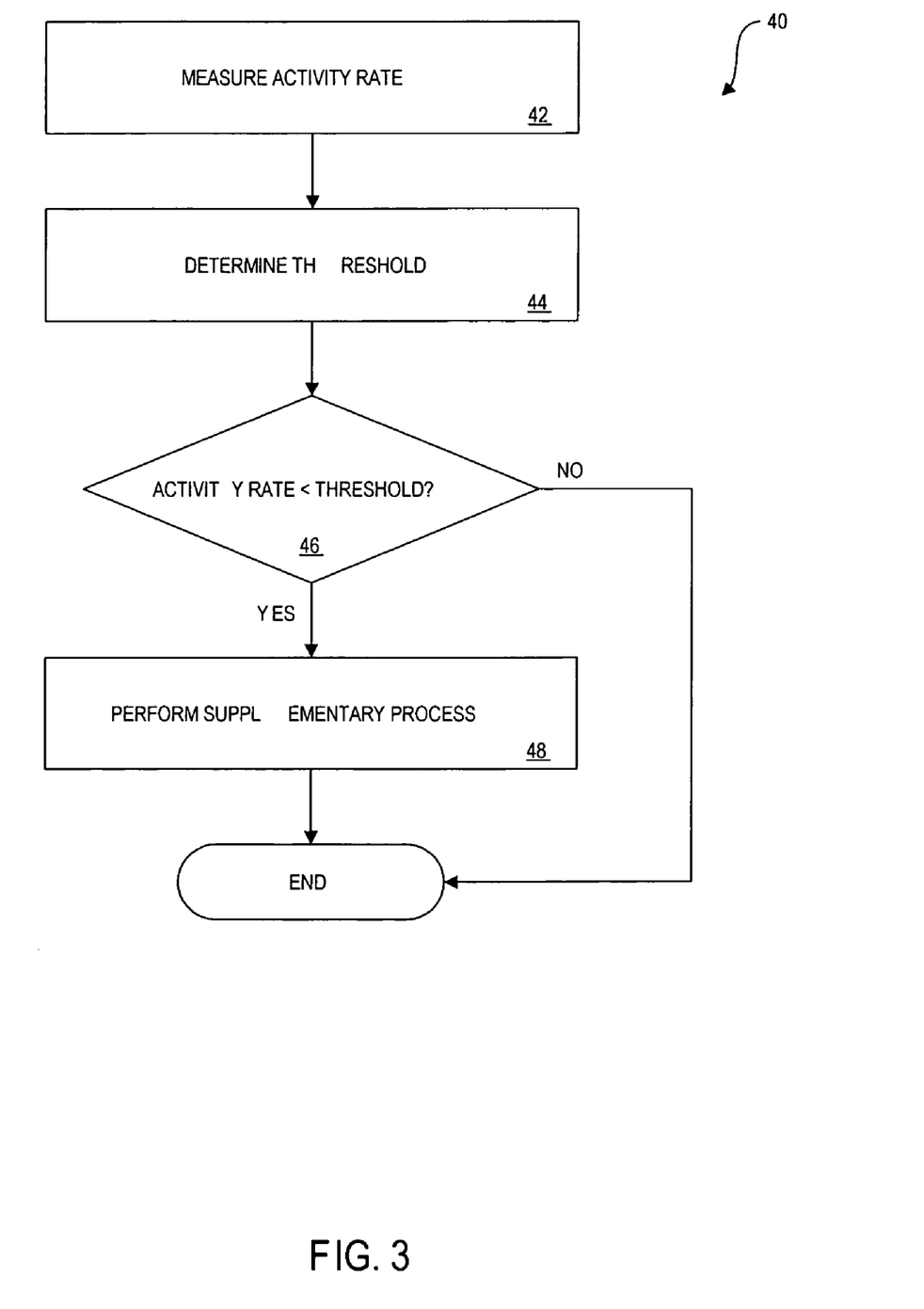
FIG. 3 is a flow chart illustrating a method provided in accordance with the present invention for controlling the performance of a supplementary process at a POS terminal.

Referring to FIG. 3, a method 40 for controlling the performance of a supplementary process initiates with the POS terminal 10 of FIGS. 1 and 2 measuring one or more criteria, such as the activity rate of the POS terminal 10 (step 42). For example, the POS terminal 10 may measure the number of completed transactions per time (transaction rate), the number of items purchased through the POS terminal 10 per period of time (item sale rate), or the number of upsells accepted by customers per period of time (upsell acceptance rate). The POS terminal 10 may measure the number of customers, such as the number of customers in a store or the number of customers in the vicinity of the POS terminal 10, through input signals received from the sensor 22. Many other types of measurements may be made by the POS terminal 10.

The POS terminal 10 then determines, based on the measured activity rate or other criteria, whether to perform a supplementary process, such as offering an upsell in exchange for change due. In one embodiment, the POS terminal 10 compares the activity rate to a predetermined threshold. Such a threshold may be determined (step 44) in a number of ways. For example, the threshold may be a predetermined value (e.g. a rate of three transactions per minute), or a variable value (e.g., three transactions per minute after 5:00 PM, two transactions per minute otherwise). Many methods of calculating thresholds, based on many variables such as time of day and day of the week, will be understood by those skilled in the art.

Once the threshold is determined, the activity rate is compared to the predetermined threshold (step 46). One comparison is to determine whether the activity rate is less than the threshold. For example, the POS terminal 10 may determine whether the measured number of completed transactions in the last ten minutes is less than a predetermined threshold of seven transactions per ten minute period.

If the comparison is valid, (e.g., the measured activity rate is less than the threshold), then the POS terminal 10 performs the supplementary process (step 48). The POS terminal 10 may perform the supplementary process by executing instructions of the program 24 (FIG. 1). Alternatively, the POS terminal 10 may perform the supplementary process by sending control signals from the control device 28 (FIG. 2) to the system 32 for providing a supplementary process. In such an embodiment, the control device 28 determines whether to enable or disable the system 32. For example, the control device 28 may disable the system 32 if the activity rate is greater than a predetermined threshold, and enable the system 32 if the activity rate is less than the predetermined threshold. The control device 28 may enable and disable the system 32 by transmitting thereto appropriate enable signals and disable signals. Such signals may be control signals, which serve only to enable or disable the performance of the supplementary process, or may be data signals, which contain additional information for use by the system 32. Instead of separate enable and disable signals, the control device 28 may transmit to the system 32 a signal that toggles the system 32 between an enabled mode and a disabled mode.

It will be understood by those skilled in the art that the system 32 may alternatively be "enabled-until-disabled". In other words, the control device 28 would only need to transmit a disable signal when the supplementary process is not to be performed. When no disable signal is transmitted to the system 32, the system 32 would perform the supplementary process (even if no enable signal is received). Similarly, the system 32 may be "disabled-until-enabled". In other words, the control device 28 would only need to transmit an enable signal when the supplementary process is to be performed. When no enable signal is transmitted to the system 32, the system 32 would not perform the supplementary process (even is no disable signal is received).

As an illustration of the above-described method 40, the POS terminal may measure an activity rate, and determine if the activity rate is less than a predetermined threshold. If so, the POS terminal then determines an upsell in dependence on a purchase, as described in a parent application of the present application, patent application Ser. No. 08/920, 116, entitled METHOD AND SYSTEM FOR PROCESSING SUPPLEMENTARY PRODUCT SALES AT A POINT-OF-SALE TERMINAL, filed on Aug. 26, 1997, issued on Sep. 12, 2000 as U.S. Pat. No. 6,119,099. The POS terminal further determines an upsell price in dependence on the purchase, and offers the customer an upsell in exchange for the upsell price.

In the above-described embodiments, the POS terminal 10 determines whether a supplementary process is or is not performed. In other embodiments, the POS terminal 10 may further select a supplementary process based on the measured activity rate or other criteria. For example, it may be desirable that different types of offers are provided to customers depending on the activity rate of the POS terminal. In particular, more time-consuming offers are provided when the measured activity rate is low, while quicker offers are provided when the measured activity rate is high.

Figure 4:
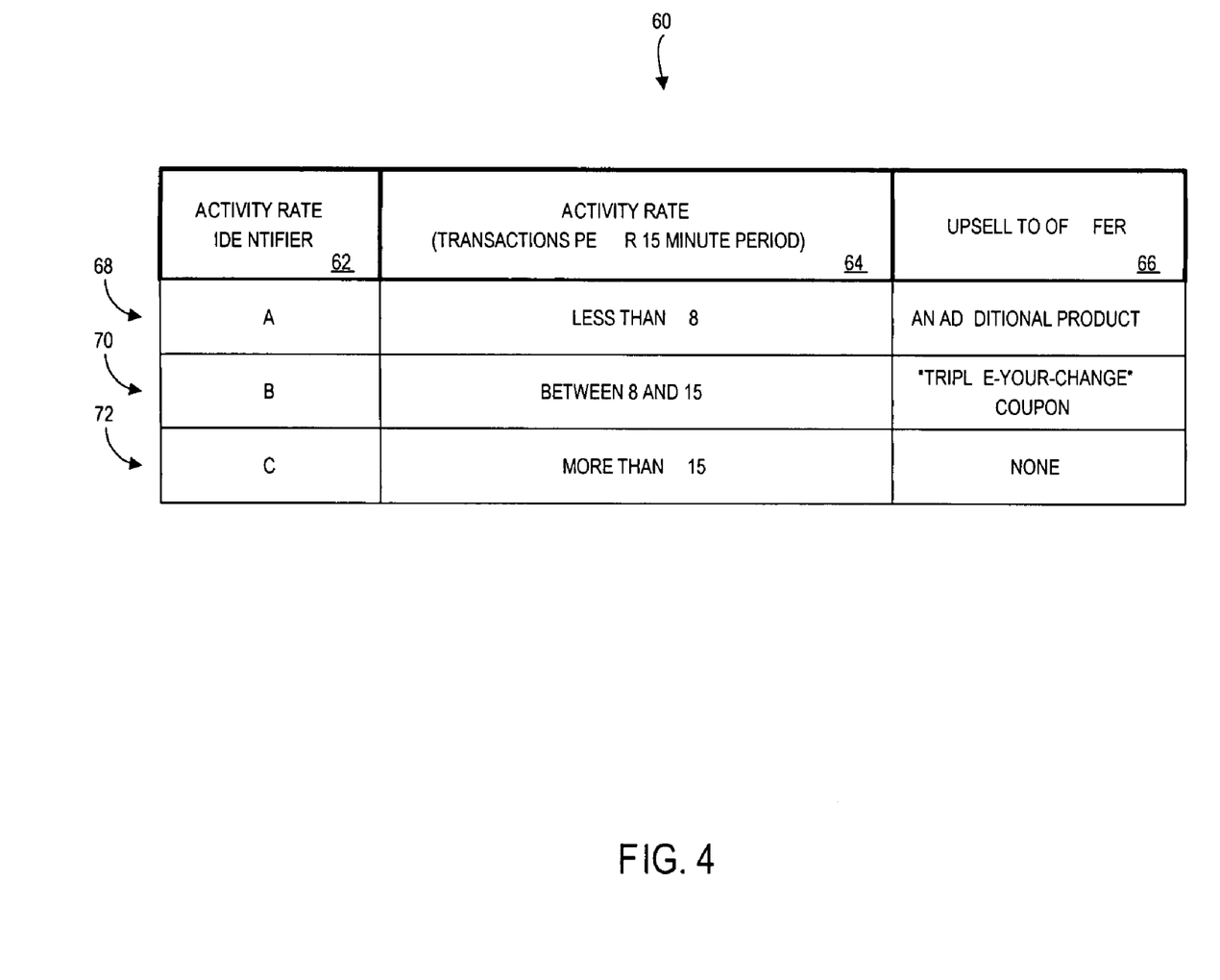
FIG. 4 is a table illustrating an offer schedule that depends on an activity rate of a POS terminal.

FIG. 4 is a table 60 that illustrates an offer schedule, which may be implemented as a database stored on the storage device 14 in a manner well known in the art. Each row of the table 60 represents an entry, and each entry defines an upsell to offer for an activity rate. In particular, each entry includes an activity rate identifier 62 that uniquely identifies the entry, an activity rate 64 which describes a rate or range of rates, and an upsell to offer 66 at that activity rate. As described in patent application Ser. No. 08/920,116, issued on Sep. 12, 2000 as U.S. Pat. No. 6,119,099, the upsell to offer 66 may include two or more upsells which are offered one at a time until an upsell is accepted.

An entry 68, corresponding to activity rates less than eight transactions per fifteen-minute period, indicates that an additional product is to be offered during these (relatively low) activity rates. Additional product offers typically have low "offer speeds", since it may be several seconds for a cashier to retrieve the additional product if the offer is accepted by the customer. An entry 70, corresponding to activity rates between eight and fifteen transactions per fifteen-minute period, indicates that a "triple-your-change" coupon is to be offered during these activity rates. Typically, printing a coupon is quicker than offering an additional product. A coupon offer thus has a higher offer speed, which is why a coupon is to be offered during periods of higher terminal activity. An entry 72 indicates that no offer is to be provided at activity rates greater than fifteen transactions per fifteen-minute period.

The above embodiments describe how the POS terminal automatically controls the performance of a supplementary process. It may further be desirable to provide a method and apparatus to, at times, counteract such automatic control. Allowing a manual override of the decision of the POS terminal would provide even finer control over the performance of the supplementary process. For example, a store manager may wish to test the supplementary process, even though the POS terminal is not currently performing the supplementary process. In addition, there may be certain situations, which a device cannot accurately account for, in which a supplementary process should not be performed.

Figure 5:
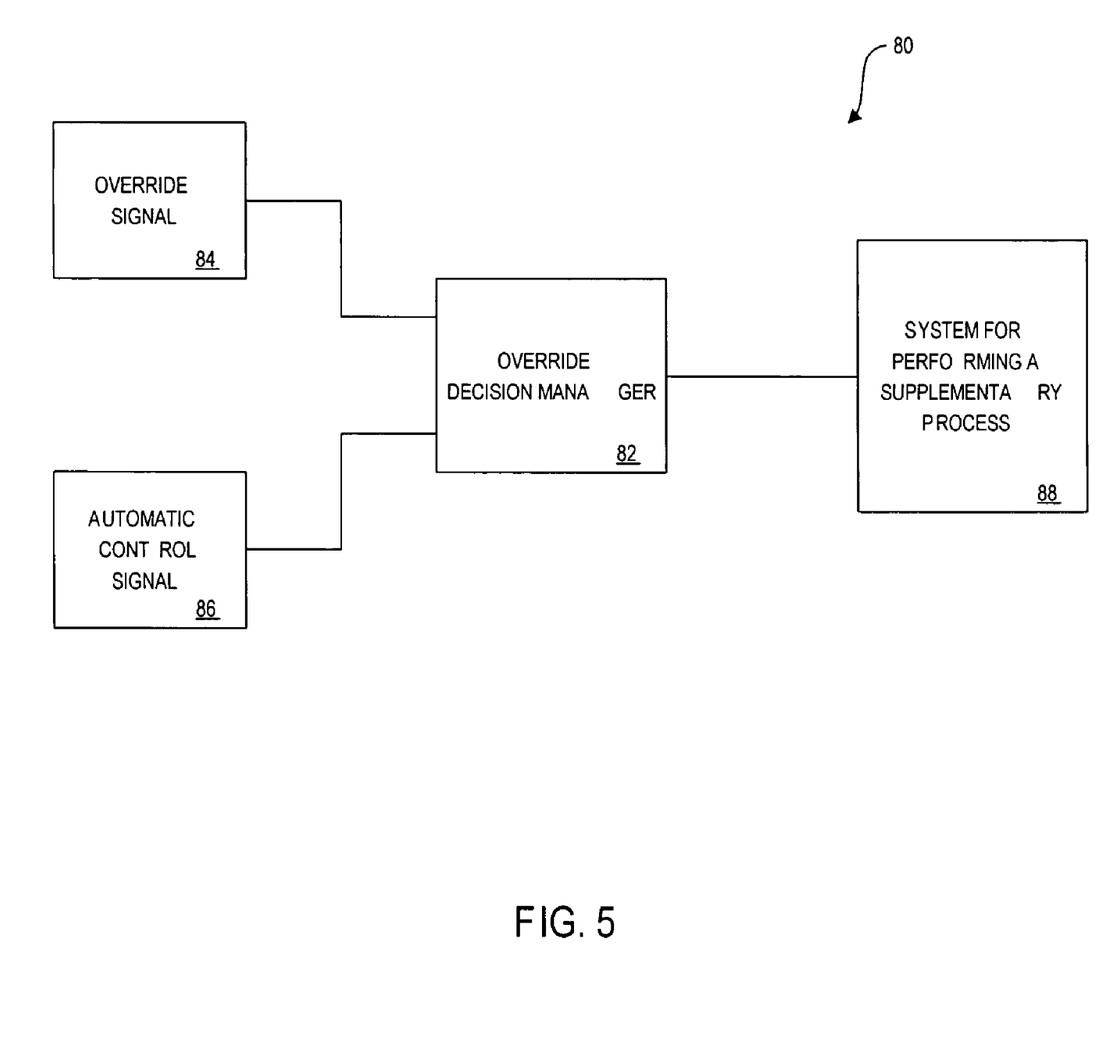
FIG. 5 is a schematic illustration of an override decision manager of the POS terminal of FIG. 2.

Referring to FIG. 5, an apparatus 80 includes an override decision manager 82 which receives input from an override signal circuit 84 and from an automatic control signal circuit 86. The override signal circuit 84 is a device that provides an override signal, such as a switch in communication with the POS terminal. The override signal circuit 84 may be one or more keys on the input device 16 (FIGS. 1 and 2), or may be another device that transmits and/or generates signals. The automatic control signal circuit 86 is the portion of the POS terminal that provides the control signal for controlling automatic performance of the supplementary process, as described above. The override decision manager 82 receives the override signal and control signal from circuits 84 and 86, respectively, and generates in dependence thereon an "enhanced control" signal for controlling performance of the supplementary process. The enhanced control signal is transmitted to a system 88 for performing a supplementary process. The system 88 may be a software module which is a component of the POS terminal 10 of FIG. 1, or may be the system 32 for providing a supplementary process of FIG. 2.

The override signal may be used to counteract the performance of the supplementary process that would have otherwise occurred in accordance with the control signal from the automatic control signal circuit 86. Referring to Table 1 below, the Truth Table shown describes the output (Enhanced Control Signal) as a function of the inputs (Override Signal and Control Signal). Table 1 describes an embodiment where the override signal may attain one of two values (i.e., 0 or 1). However, those skilled in the art will understand that the override signal may attain more than two values.

TABLE 1

Truth Table for Override Decision Manager

| Override Signal | Control Signal | Enhanced Control Signal |
|---|---|---|
| 0 | 0 | 0 |
| 0 | 1 | 1 |
| 1 | 0 | 0 |
| 1 | 1 | 0 | where:
Override Signal = 0 for Allowing Automatic Control
Override Signal = 1 for Disabling the Supplemental Process
Control Signal = 0 for Disabling the Supplemental Process
Control Signal = 1 for Enabling the Supplemental Process
Enhanced Control Signal = 0 for Disabling the Supplemental Process
Enhanced Control Signal = 1 for Enabling the Supplemental Process For example, when Override Signal=1 and Control Signal=1, then a user is overriding the automatic determination to enable the supplemental process. Accordingly, the Enhanced Control Signal=0, and the supplemental process is disabled.

Figure 6:
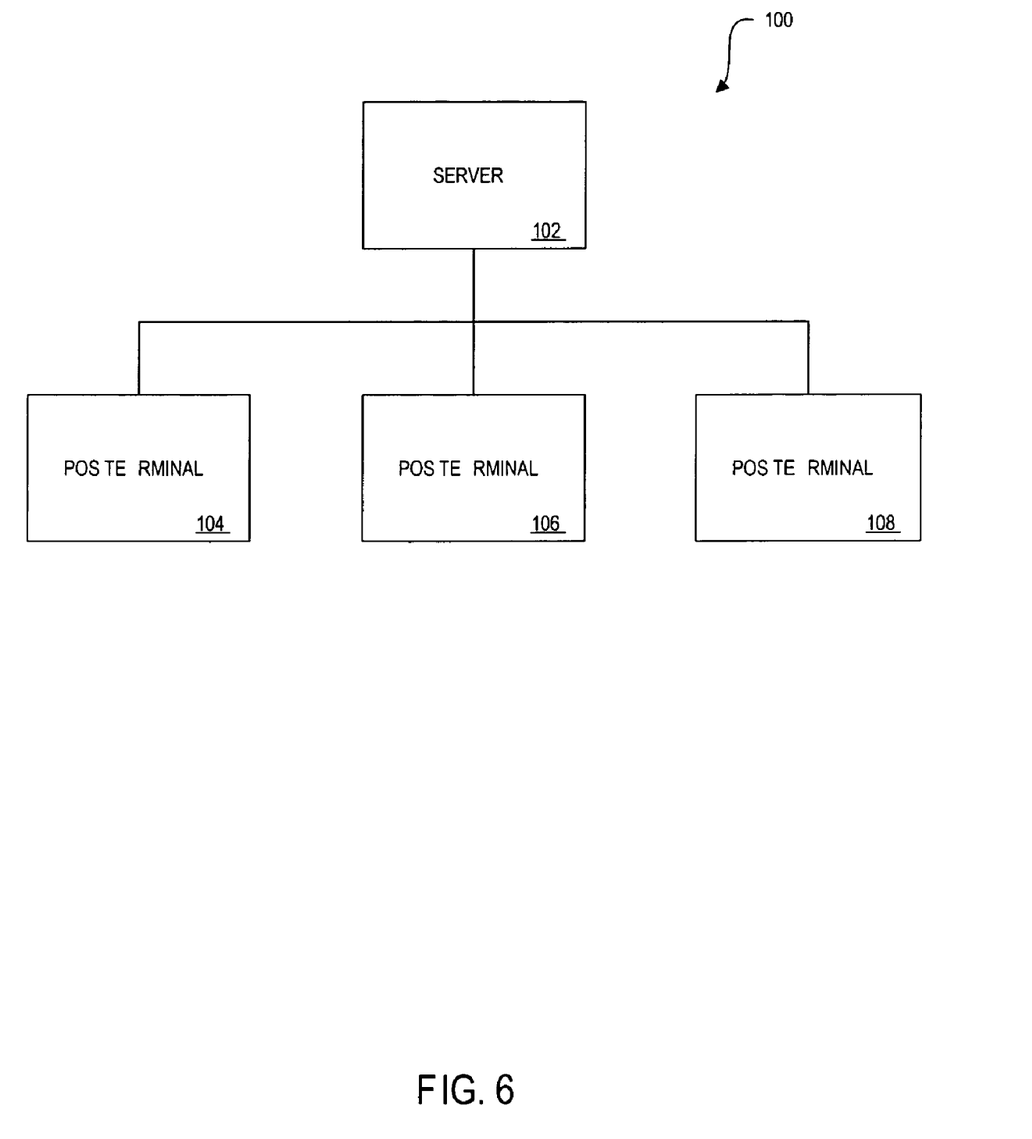
FIG. 6 is a schematic illustration of a network of POS terminals.

Referring to FIG. 6, a network 100 includes a server computer 102 in communication with POS terminals 104, 106 and 108. The server computer 102 may itself be a POS terminal, as described above. Although three POS terminals are shown in FIG. 6, any number of POS terminals may be in communication with the server computer 102 without departing from the spirit and scope of the present invention. The server computer 102 may perform many of the above-described processes, especially those processes which are performed for more than one POS terminal. For example, the server computer 102 may (i) measure the activity rate of any or all of the POS terminals 104, 106 and 108, (ii) determine whether to provide a supplementary process at any or all of the POS terminals 104, 106 and 108, (iii) enable or disable one or more systems for providing a supplementary process, and/or (iv) transmit an override signal to any or all of the POS terminals 104, 106 and 108. The server computer 102 may also collect data from the POS terminals 104, 106 and 108, thereby aggregating information about the processes that each POS terminal performs. For example, each POS terminal may measure its own activity rate, and transmit to the server computer 102 signals indicative of the measured activity rate. The server computer 102 may then determine an overall activity rate for the network 100 of POS terminals.

The measured activity rate may be, for example, the number of POS terminals in use (processing transactions) or the percentage of POS terminals in use. Based on the activity rate, the server computer 102 may determine whether to permit the supplementary process to be performed at each POS terminal. Alternatively, the server computer 102 may determine which of the POS terminals are to perform the supplementary process.

Figure 7:
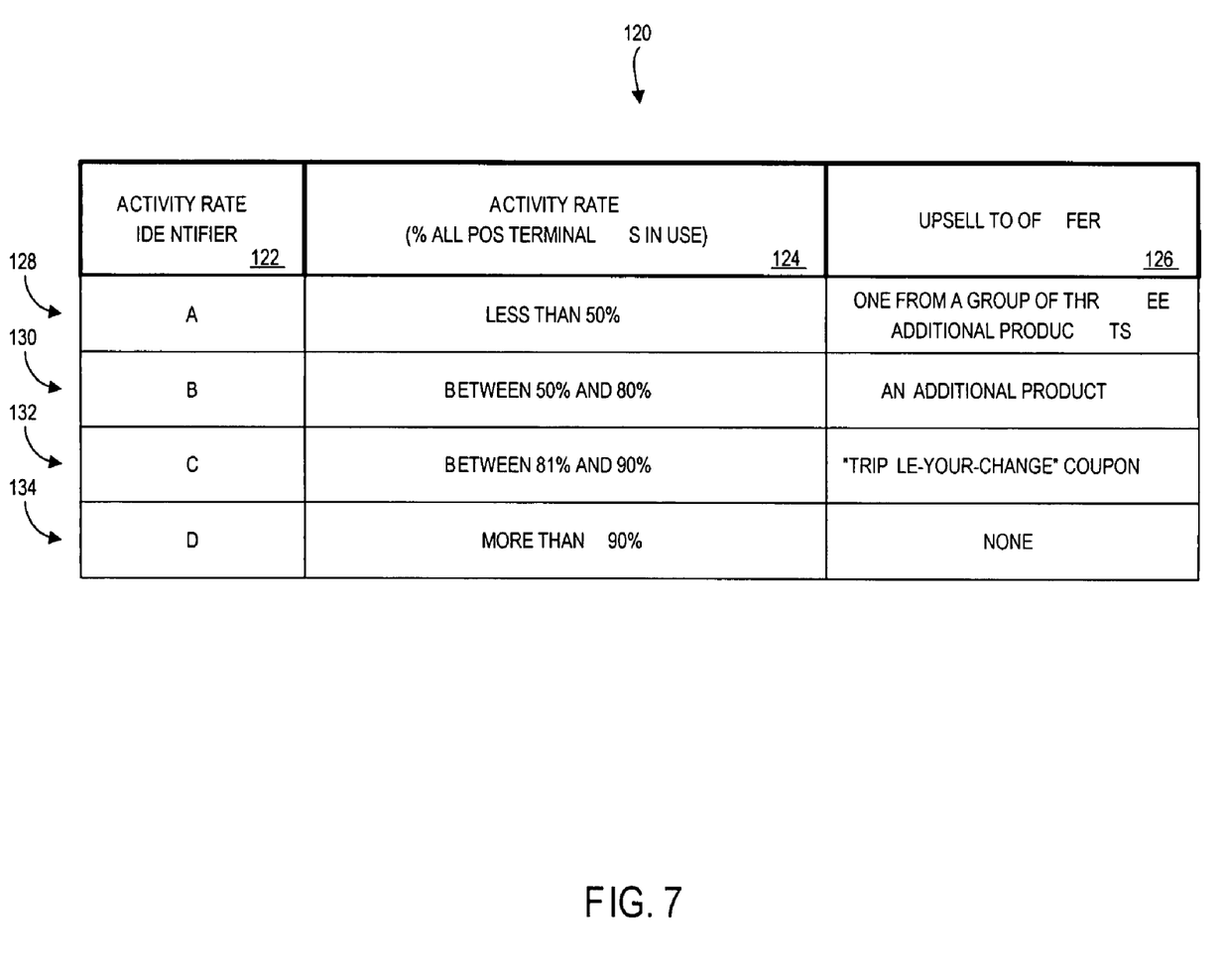
FIG. 7 is a table illustrating an offer schedule that depends on an activity rate of a plurality of POS terminals.

FIG. 7 shows a table 120 that illustrates an offer schedule for a network of POS terminals. Each row of the table 120 represents an entry, and each entry defines an upsell to offer for an activity rate. The activity rate used in the table 120 is based on which of a plurality of terminals are in use. Each entry includes an activity rate identifier 122 that uniquely identifies the entry, an activity rate 124 which describes a rate or range of rates, and an upsell to offer 126 at that activity rate. For example, the entry 128, corresponding to less than 50% of all POS terminals in use, indicates that three products are to be offered, and the customer is to choose one. The entries 130, 132 and 134 similarly describe upsells to be offered for different activity rates. As described above, more time-consuming upsells such as multiple upsells offered one after the other may be offered during periods of lower activity.

Although the present invention has been described with respect to a preferred embodiment thereof, those skilled in the art will note that various substitutions may be made to those embodiments described herein without departing from the spirit and scope of the present invention.

What is claimed is:

1. A method for controlling the performance of a supplementary process at a point-of-sale terminal, comprising:
   measuring an activity rate of a point-of-sale terminal; and
   providing a supplementary product offer in accordance with the activity rate and an offer schedule;
      in which the offer schedule comprises a set of supplementary product offers, each supplementary product offer corresponding to a predetermined range of activity rates, and
      in which successively time-consuming supplementary product offers correspond to successively greater ranges of activity rates.

2. An apparatus for controlling the performance of a supplementary process at a point-of-sale terminal, comprising:
   a storage device; and
   a processor connected to the storage device,
   the storage device storing a program for controlling the processor; and
   the processor operative with the program to:
      measure an activity rate of a point-of-sale terminal; and
      provide a supplementary product offer in accordance with the activity rate and an offer schedule;
      in which the offer schedule comprises a set of supplementary product offers, each supplementary product offer corresponding to a predetermined range of activity rates, and
      in which successively time-consuming supplementary product offers correspond to successively greater ranges of activity rates.

3. A method for controlling the performance of a supplementary process at a point-of-sale terminal, comprising:
   measuring an activity rate of a point-of-sale terminal; and
   if the activity rate is less than a predetermined threshold,
      determining an upsell in dependence on a purchase,
      determining an upsell price in dependence on the purchase, and
      offering to exchange the upsell price for the upsell.

4. An apparatus for controlling the performance of a supplementary process at a point-of-sale terminal, comprising:
- a storage device; and
- a processor connected to the storage device,
- the storage device storing a program for controlling the processor; and
- the processor operative with the program to:
    - measure an activity rate of a point-of-sale terminal; and
    - if the activity rate is less than a predetermined threshold,
        - determine an upsell in dependence on a purchase,
        - determine an upsell price in dependence on the purchase, and
        - offer to exchange the upsell price for the upsell.

5. A method for controlling performance of a supplementary process at a point-of-sale terminal, comprising:
- measuring an activity rate of a point-of-sale terminal; and
- if the activity rate is below a first predetermined threshold, offering a first upsell having an first offer speed; and
- if the activity rate is above a second predetermined threshold, offering a second upsell having a second offer speed greater than the first offer speed.

6. An apparatus for controlling the performance of a supplementary process at a point-of-sale terminal, comprising:
- a storage device; and
- a processor connected to the storage device,
- the storage device storing a program for controlling the processor; and
- the processor operative with the program to:
    - measure an activity rate of a point-of-sale terminal; and
    - if the activity rate is below a first predetermined threshold,
        - offer a first upsell having an first offer speed; and
    - if the activity rate is above a second predetermined threshold,
        - offer a second upsell having a second offer speed greater than the first offer speed.

7. A method for controlling the performance of a supplementary process at a point-of-sale terminal, comprising:
- measuring an activity rate of a point-of-sale terminal; and
- if the activity rate is less than a predetermined threshold,
    - determining an upsell in dependence on a purchase,
    - determining an upsell price in dependence on change due from the purchase, and
    - offering to exchange the upsell price for the upsell.

8. An apparatus for controlling the performance of a supplementary process at a point-of-sale terminal, comprising:
- a storage device; and
- a processor connected to the storage device,
- the storage device storing a program for controlling the processor; and
- the processor operative with the program to:
    - measure an activity rate of a point-of-sale terminal; and
    - if the activity rate is less than a predetermined threshold,
        - determine an upsell in dependence on a purchase,
        - determine an upsell price in dependence on change due from the purchase, and
        - offer to exchange the upsell price for the upsell.

9. A method, comprising:
measuring an activity rate of a point-of-sale terminal;
determining an upsell price in dependence on change due from a purchase,
if the activity rate is below the first predetermined threshold, offering a first upsell for a supplementary product, the first upsell having an first offer speed;
if the activity rate is above the second predetermined threshold, offering a second upsell for a supplementary product, the second upsell having a second offer speed greater than the first offer speed; and
exchanging the upsell for the offered upsell price.

10. An apparatus comprising:
a storage device; and
a processor connected to the storage device,
the storage device storing a program for controlling the processor; and
the processor operative with the program to:
  measure an activity rate of a point-of-sale terminal;
  determine an upsell price in dependence on change due from a purchase,
  if the activity rate is below the first predetermined threshold, offer a first upsell for a supplementary product, the first upsell having an first offer speed;
  if the activity rate is above the second predetermined threshold, offer a second upsell for a supplementary product, the second upsell having a second offer speed greater than the first offer speed; and
  exchange the upsell for the offered upsell price.

\* \* \* \* \*